United States Patent
Choi et al.

(10) Patent No.: US 10,282,010 B2
(45) Date of Patent: May 7, 2019

(54) DISPLAY DEVICE

(71) Applicant: Samsung Display Co., Ltd., Yongin, Gyeonggi-Do (KR)

(72) Inventors: Jae Woo Choi, Seoul (KR); Sang Hyun Lim, Cheonan-si (KR); Chang Sub Jung, Hwaseong-si (KR); A Ra Jo, Seoul (KR); Eun Gil Choi, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/738,654

(22) Filed: Jun. 12, 2015

(65) Prior Publication Data

US 2016/0026315 A1    Jan. 28, 2016

(30) Foreign Application Priority Data

Jul. 25, 2014  (KR) .......................... 10-2014-0095092

(51) Int. Cl.
   *G06F 3/041*  (2006.01)
   *G06F 3/044*  (2006.01)

(52) U.S. Cl.
   CPC ............ *G06F 3/0414* (2013.01); *G06F 3/044* (2013.01); *G06F 2203/04105* (2013.01); *G06F 2203/04111* (2013.01)

(58) Field of Classification Search
   CPC .... G06F 3/044; H03K 17/962; H03K 17/955; H03K 17/9645; G01D 5/24
   See application file for complete search history.

(56) References Cited

U.S. PATENT DOCUMENTS

| 6,826,968 | B2 |   | 12/2004 | Manaresi et al. |
| 9,041,418 | B2 | * | 5/2015  | Hsieh ...................... G06F 3/044 |
|           |    |   |         | 178/18.01 |
| 9,329,734 | B2 | * | 5/2016  | Lin ........................ G06F 3/0418 |
| 10,001,883 | B2 | * | 6/2018  | Kent ................... G06F 3/03547 |

(Continued)

FOREIGN PATENT DOCUMENTS

| EP | 1211633 A1 | 5/2002 |
| KR | 10-2009-0076126 A | 7/2009 |

(Continued)

OTHER PUBLICATIONS

Sergio et al., "A Textile Based Capacitive Pressure Sensor", Proc. IEEE sensor, vol. 2, pp. 1625-1630, (2002).

*Primary Examiner* — William Lu
(74) *Attorney, Agent, or Firm* — Innovation Counsel LLP (57) ABSTRACT

A display device includes: a display panel including an upper electrode and an encapsulation layer provided on the upper electrode; a touch panel including a first touch electrode and a second touch electrode each facing the upper electrode and positioned between the display panel and a cover window covering the display panel, the first touch electrode being separated from the second touch electrode; an elastic layer provided on the display panel and deforming in response to an applied pressure from a touch; and a touch sensor programmed to detect an applied pressure from a change in gaps between the first and second touch electrodes and the upper electrode due to the applied pressure, and to detect a capacitance between the first touch electrode and the second touch electrode caused by the touch, so as to sense a position of the touch.

12 Claims, 9 Drawing Sheets

(56) References Cited

U.S. PATENT DOCUMENTS

| | | | |
|---|---|---|---|
| 2006/0092139 A1* | 5/2006 | Sharma | G06F 3/0412 345/173 |
| 2008/0246741 A1* | 10/2008 | Hinata | G06F 3/045 345/173 |
| 2010/0253651 A1* | 10/2010 | Day | G06F 3/044 345/175 |
| 2010/0259503 A1* | 10/2010 | Yanase | G06F 3/044 345/174 |
| 2011/0069036 A1* | 3/2011 | Anno | G06F 3/03545 345/174 |
| 2011/0084930 A1* | 4/2011 | Chang | G06F 3/0416 345/173 |
| 2011/0090175 A1* | 4/2011 | Mamba | G06F 3/0412 345/174 |
| 2011/0096025 A1* | 4/2011 | Slobodin | G06F 3/044 345/174 |
| 2011/0187666 A1* | 8/2011 | Min | G06F 3/041 345/173 |
| 2012/0075214 A1* | 3/2012 | Kim | G06F 3/041 345/173 |
| 2012/0075218 A1* | 3/2012 | Lin | G06F 3/0418 345/173 |
| 2012/0098783 A1* | 4/2012 | Badaye | G06F 3/0416 345/174 |
| 2012/0103779 A1* | 5/2012 | Hsu | G06F 3/044 200/600 |
| 2012/0169649 A1* | 7/2012 | Chang | G06F 3/0418 345/174 |
| 2014/0028575 A1 | 1/2014 | Parivar et al. | |

FOREIGN PATENT DOCUMENTS

| | | |
|---|---|---|
| KR | 10-2009-0105448 A | 10/2009 |
| KR | 10-1116980 B1 | 3/2012 |
| KR | 10-2012-0138892 A | 12/2012 |

* cited by examiner

DISPLAY DEVICE

CROSS-REFERENCE TO RELATED APPLICATION

This application claims priority to, and the benefit of, Korean Patent Application No. 10-2014-0095092 filed in the Korean Intellectual Property Office on Jul. 25, 2014, the entire contents of which are incorporated herein by reference.

BACKGROUND (a) Field

Embodiments of the present invention relate generally to flat panel displays. More specifically, embodiments of the present invention relate to a display device provided with a touch panel.

(b) Description of the Related Art

Flat panel display devices have largely replaced cathode-ray tube display devices due to characteristics such as superior lightness, thinness, and the like. As representative examples of flat panel display devices, there are the liquid crystal display (LCD) device and the organic light emitting diode (OLED) display device. The organic light emitting diode (OLED) display device can have excellent luminance and viewing angle and does not require a back light and thus can be implemented as an ultra-thin type display, as compared with the liquid crystal display (LCD) device.

The organic electric field emissive display device can be characterized as a passive matrix type or an active matrix type according to its driving method, and the active matrix device includes a circuit using thin film transistors (TFTs).

Recently, the organic electric field emissive display device has been used with a digitizer such as a touch panel for detecting a position of a finger or a pen in a digital manner, converting it into an XY coordinate value, outputting the value, and thereby inputting letters or pictures more easily and precisely on one side of a display panel for realizing images, so that a user may watch the images displayed on the display panel and select desired information.

The touch panel can be classified by its method for sensing contact, and in particular can be characterized as a resistive type panel determining a contact position as a resistance-induced voltage gradient while a DC voltage is applied, or a capacitive type panel forming an equipotential on a conductive layer and sensing a position where a voltage is changed according to a contact.

Particularly, regarding the capacitive type, when a touch is performed without a finger or a conductor, no change of voltage caused by a contact is generated so the touch cannot be recognized, and an additional pressure sensor is required to recognize the touch depending on a position and magnitude of the pressure. This results in an increase in production cost.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a display device for recognizing both a touch and a pressure-induced touch by a sensor.

An exemplary embodiment of the present invention provides a display device including: a display panel including an upper electrode and an encapsulation layer provided on the upper electrode; a touch panel including a first touch electrode and a second touch electrode each facing the upper electrode and positioned between the display panel and a cover window for covering the display panel, the first touch electrode being separated from the second touch electrode; an elastic layer provided on the display panel and deforming in response to an applied pressure from a touch; and a touch sensor programmed to detect an applied pressure from a change in gaps between the first and second touch electrodes and the upper electrode due to the applied pressure and to detect a capacitance between the first touch electrode and the second touch electrode caused by the touch, so as to sense a position of the touch.

The touch sensor determines the pressure to sense a touch position caused by the applied pressure, designates a capacitance resulting from the applied pressure as a reference capacitance, and compares the capacitance caused by the touch to the reference capacitance to sense the touch position.

The display device further includes a ground wire for electrically connecting the touch sensor and the first and second touch electrodes.

The touch sensor is provided on a flexible printed circuit board connected to the substrate.

The elastic layer comprises a resin.

The elastic layer is configured with an adhesive tape provided on an edge of the display panel.

The display device further includes a driver for applying a driving signal to the subpixels.

The driver is provided on the substrate or is provided on a driving substrate connected to the substrate.

The first touch electrode is a driving electrode configured to receive a touch sensing signal, and the second touch electrode is a sensing electrode for detecting a touch.

The first touch electrode and the second touch electrode are provided between the elastic layer and the cover window.

The first touch electrode and the second touch electrode are provided on different layers.

The display device includes an insulating layer provided between the first touch electrode and the second touch electrode and separating the first touch electrode and from the second touch electrode.

The second touch electrode is formed on the cover window.

The first touch electrode is provided between the encapsulation layer and the elastic layer, and the second touch electrode is provided between the elastic layer and the cover window.

In addition to the technical object of the present invention, other characteristics and advantages of the present invention will be described hereinafter, and will be clearly understood by a person skilled in the art in the technical field to which the present invention belongs.

The present invention provides subsequent advantages.

The present invention receives the detection signal caused by external pressure as well as the detection signal induced by an external touch, and uses a single touch sensor to detect the touch position, so there is no need to employ an additional pressure sensor. This reduces production costs The present invention can detect the touch position generated by a pressure when it is difficult to perform a touch with a conductor such as a finger.

The present invention forms the second touch electrode on the cover window surface, to reduce the thickness of the display device.

In addition, other characteristics and advantages of the present invention can be found through the exemplary embodiments of the present invention.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Parts that are unrelated to the description of the exemplary embodiments are not shown to make the description clear, and like reference numerals designate like elements throughout the specification. The various figures are not to scale.

Exemplary embodiments of the present invention to solve the problem will now be described in detail with reference to accompanying drawings.

A configuration of a display device according to an exemplary embodiment of the present invention will now be described with reference to FIG. 1 and FIG. 2.

Figure 1:
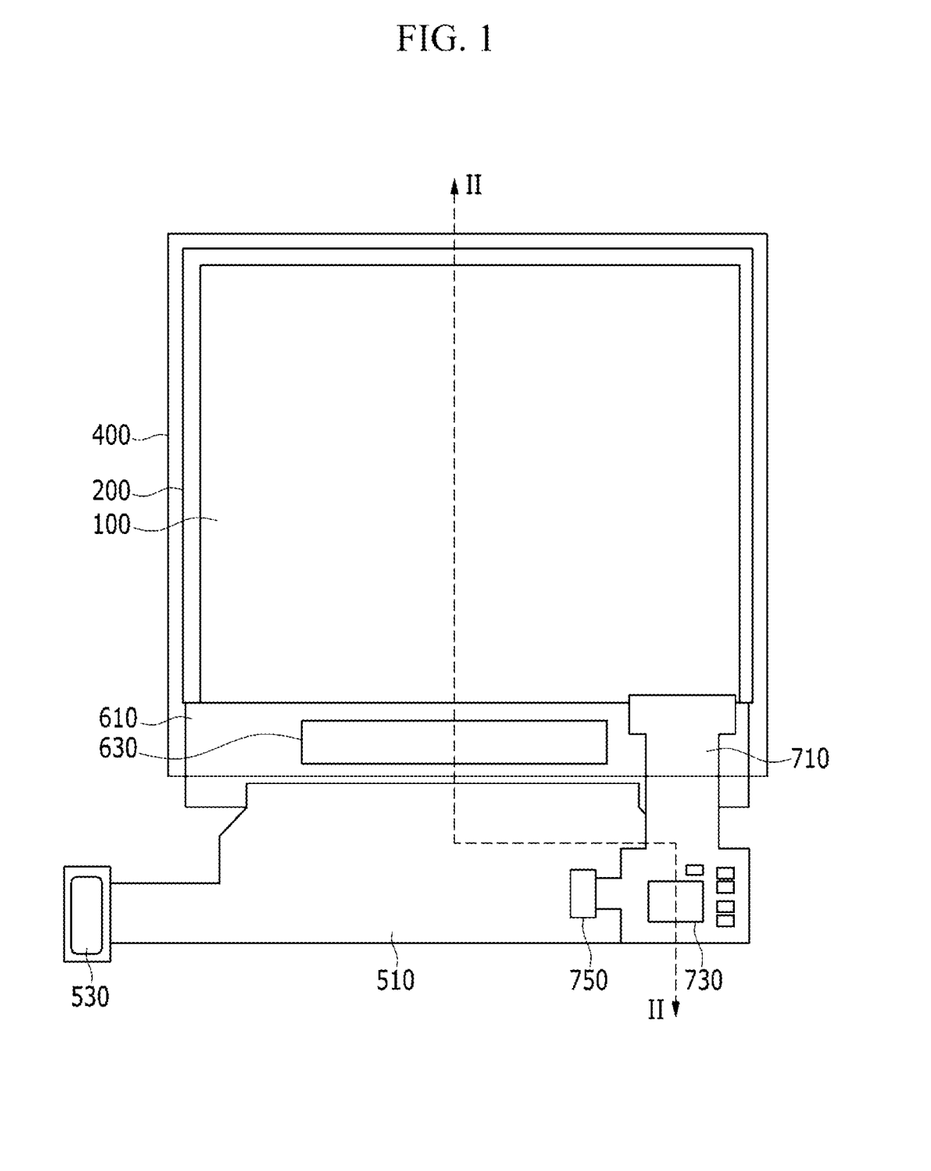
FIG. 1 shows a top plan view of a display device according to an exemplary embodiment of the present invention.
Figure 2:
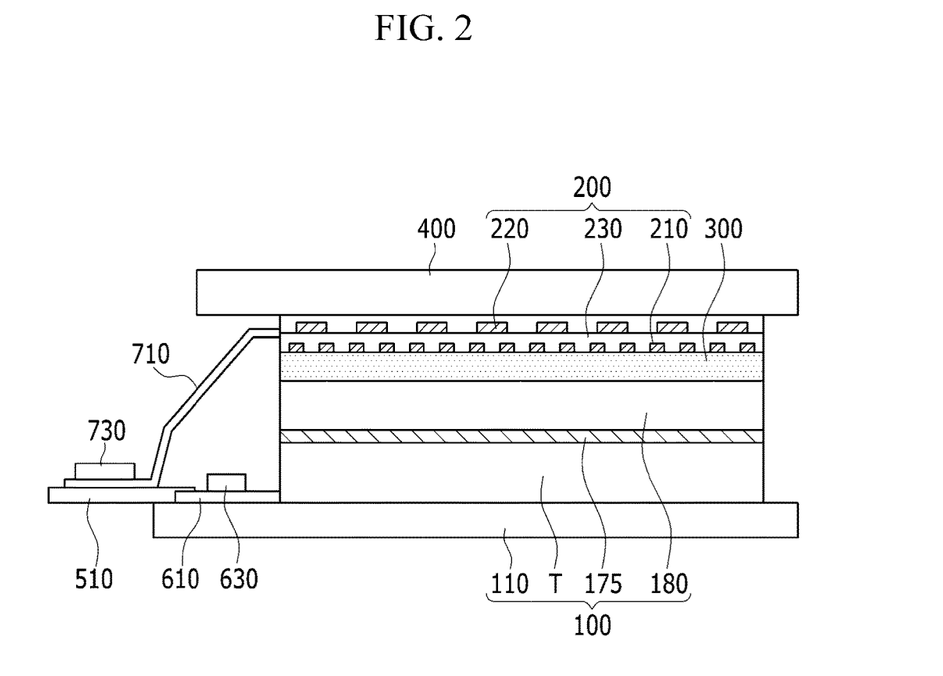
FIG. 2 shows a cross-sectional view of a display device according to an exemplary embodiment of the present invention.

FIG. 1 shows a top plan view of a display device according to an exemplary embodiment of the present invention, and FIG. 2 shows a cross-sectional view with respect to a line II-II of FIG. 1.

Referring to FIG. 1 and FIG. 2, the display device includes a display panel 100, a driving substrate 610, a driver 630, a touch panel 200, an elastic layer 300, a cover window 400, a first flexible printed circuit board 510, a second flexible printed circuit board 710, and a touch sensor 730.

The display panel 100 includes an upper electrode 175 of an organic light emitting diode (not shown) included in pixels on thin film transistors (T), and an encapsulation layer 180 provided on the organic light emitting diode. That is, the display panel 100 may be an organic light emitting device using a plurality of pixels including organic light emitting diodes (OLEDs). The display panel 100 is assumed to be an organic light emitting device, but may be any other type of display device as well. For example, display panel 100 may be a display panel including one of the liquid crystal display (LCD), the electrophoretic display, the field emission display (FED), and the plasma display panel (PDP).

The display panel 100 will be described later with reference to FIG. 3.

The touch panel 200 is disposed between the display panel 100 and the cover window 400 for covering the display panel 100. The touch panel 200 includes a plurality of first touch electrodes 210 and second touch electrodes 220 for detecting a touch, and an insulating layer 230 provided between the first touch electrodes 210 and second touch electrodes 220 to separate the first touch electrodes 210 from the second touch electrodes 220.

The touch panel 200 will be described later with reference to FIG. 4.

The elastic layer 300 deforms elastically in response to a force caused by an external touch and pressure, and is provided between the display panel 100 and the touch panel 200.

The elastic layer 300 represents a layer for elastically varying a gap between a plurality of touch electrodes 210 and 220 of the touch panel 200 and the upper electrode 175 of the display panel 200 by restorably deforming under external touch and pressure, thus generating a capacitance that changes according to a change in the gap between the touch electrodes 210 and 220 and the upper electrode 175.

The elastic layer 300 can be formed of any material and shape that will vary the gap between the touch electrodes 210 and 220 and the upper electrode 175 in a restorable and elastic manner. Without restriction, for example, well-known elastic materials such as polyolefin-based, PVC-based, polystyrene-based, polyester-based, polyurethane-based, or polyamide-based materials, and particularly elastic silicon, may be used.

The elastic layer 300 can be made of a resin that deforms under external touch and pressure and has adherence for attaching the display panel 100 to the touch panel 200.

The driver 630 is designed for driving a plurality of pixels, and is disposed on the driving substrate 610. The driving substrate 610 and the display substrate 110 of the display panel 100 have been shown here to be separately provided, but they can be provided as a single substrate. For example, a display area can be provided on the display substrate 110, a plurality of pixels can be disposed in the display area, and a driver 630 can be disposed in a peripheral area of the driving substrate 610 or display substrate 110.

A first connector 530 for receiving a signal from an external device is disposed on the first flexible printed circuit board 510. Driving signals, touch control signals, and power supply voltages for a plurality of pixels are input through the first connector 530. The first flexible printed circuit board 510 is connected to the driving substrate 610, and transmits the driving signals and the power supply voltages to the driver 630.

A second connector 750 and the touch sensor 730 are disposed on the second flexible printed circuit board 710. The second connector 750 is connected to first flexible printed circuit board 510. The second connector 750 transmits a touch control signal and a power supply voltage between the first flexible printed circuit board 510 and the second flexible printed circuit board 710. The touch control signal and the power supply voltage applied through the second connector 750 are transmitted to the touch sensor 730. The second flexible printed circuit board 710 is connected to the touch panel 200.

The touch sensor 730 applies a touch detecting signal to the plurality of first and second touch electrodes 210 and 220 included in the touch panel 200 according to the touch control signal, receives a detection signal caused by an external touch to detect a touch position, and receives a detection signal caused by an external pressure to detect a touch position.

The display panel 100 will be described in further detail with reference to FIG. 3.

Figure 3:
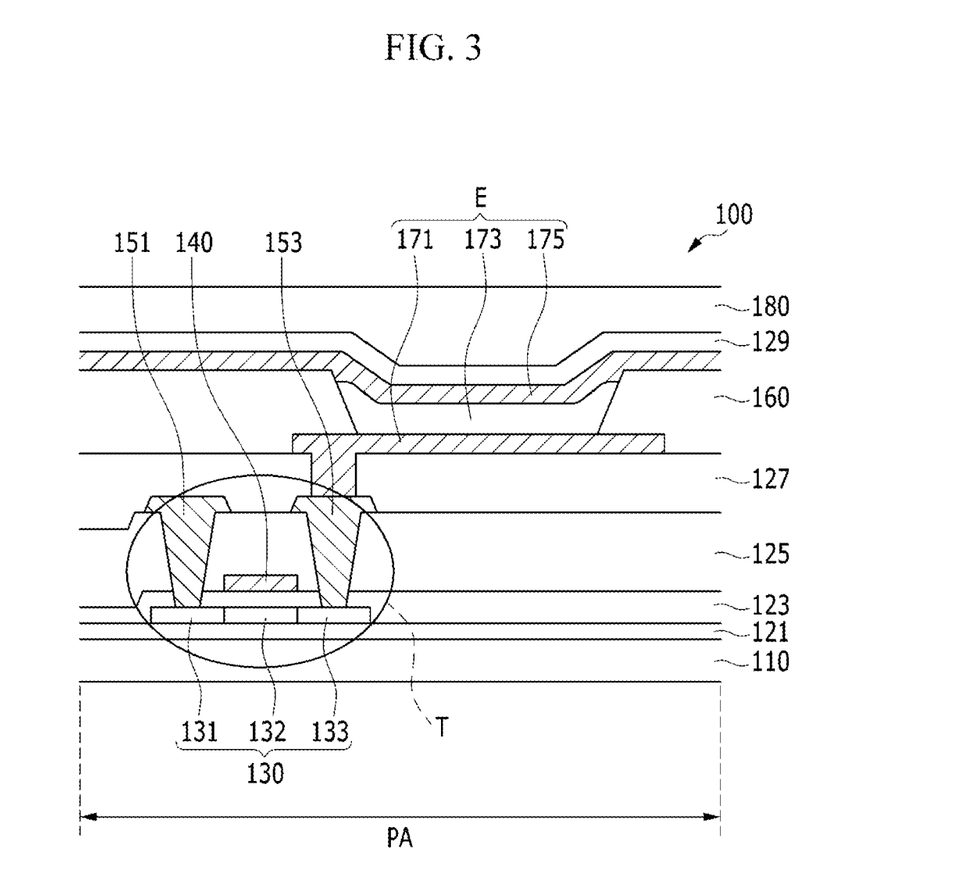
FIG. 3 shows a cross-sectional view of a display panel included in a display device according to an exemplary embodiment of the present invention.

FIG. 3 shows a cross-sectional view of a display panel 100 included in a display device according to an exemplary embodiment of the present invention. For ease of description, one pixel area (PA) has been shown in FIG. 3, and the display panel 100 according to an exemplary embodiment of the present invention includes a plurality of pixels formed in one or more pixel areas (PAs).

Referring to FIG. 3, the display panels 100 can be an organic light emitting device including the display substrate 110 on which thin film transistors (T), organic light emitting diodes (E), and the encapsulation layer 180 for encapsulating the transistors T and diodes E, are formed.

A buffer layer 121 is formed on the display substrate 110, and a thin film transistor (T) is formed on the buffer layer 121.

Here, the display substrate 110 can be formed of an insulation material or a metallic material. Glass or plastic can be used as the insulation material, and stainless steel (SUS) can be used as the metallic material. The buffer layer 121 prevents dispersion of impurities from the display substrate 110 when an active layer (to be described) is formed, and for example, the buffer layer 121 can be formed by a silicon nitride (SiN) layer or by stacking a silicon nitride ($SiN_x$) layer and a silicon oxide ($SiO_x$) layer.

The thin film transistor (T) includes an active layer 130, a gate insulating layer 123, a gate electrode 140, an interlayer insulating layer 125, a source electrode 151, and a drain electrode 153.

The active layer 130 is made of silicon on the buffer layer 121, and its center portion includes an active area 132 for forming a channel, and source and drain regions 131 and 133 in which an impurity is doped at a high concentration on respective sides of the active area 132.

The gate insulating layer 123 is formed on the active layer 130.

The gate electrode 140 and a gate line (not shown) extending generally in one direction are formed corresponding to the active area 132 of the active layer 130 on the gate insulating layer 123.

The interlayer insulating layer 125 is formed on the gate electrode 140 and a front of a gate line (not shown), and the interlayer insulating layer 125 and the gate insulating layer 123 respectively include contact holes for exposing the source and drain regions 131 and 133 provided on respective sides of the active area 132.

The source and drain electrodes 151 and 153 contacting the source and drain regions 131 and 133 exposed through the contact holes are formed on the interlayer insulating layer 125.

A passivation layer 127, including a contact hole for exposing the drain electrode 153, is formed on the source and drain electrodes 151 and 153 and the interlayer insulating layer 125.

An organic light emitting diode (E), including a lower electrode 171, an organic emission layer 173 and the upper electrode 175, is formed on the thin film transistor (T).

The lower electrode 171 forms an anode connected to the drain electrode 153 through the contact hole in the passivation layer 127.

The organic emission layer 173 is formed on the lower electrode 171, and a bank layer 160 is formed the organic emission layer 173 to contain and define the shape of the organic emission layer 173.

The organic emission layer 173 can be configured with a single layer made of a light emission material, and can alternatively be configured with multiple layers including a hole injection layer, a hole transport layer, an emission layer, an electron transport layer, and an electron injection layer to increase light emission efficiency.

The organic emission layer 173 expresses one or more of red (R), green (G), and blue (B) colors, and to generally achieve this purpose, an organic material for emitting one or more of red (R), green (G), and blue (B) colors is patterned and used for each pixel area.

The upper electrode 175 is a cathode, and is formed on the organic emission layer 173.

Regarding the organic light emitting device, when a predetermined voltage is applied to the lower electrode 171 and the upper electrode 175 according to the selected color signal, the holes injected by the lower electrode 171 and the electrons provided by the upper electrode 175 are transported to the organic emission layer 173 to form excitons, and when the excitons transit to the base state from the excited state, visible light photons are emitted.

The emitted light is passed to the outside through the transparent lower electrode 171 or upper electrode 175, so that the organic light emitting device realizes any desired image.

A thin-film type of moisture-permeation preventing insulating layer (not shown) can be formed on the organic light emitting diode (E), and the encapsulation layer 180 can be provided on this moisture-permeation preventing insulating layer.

Figure 4:
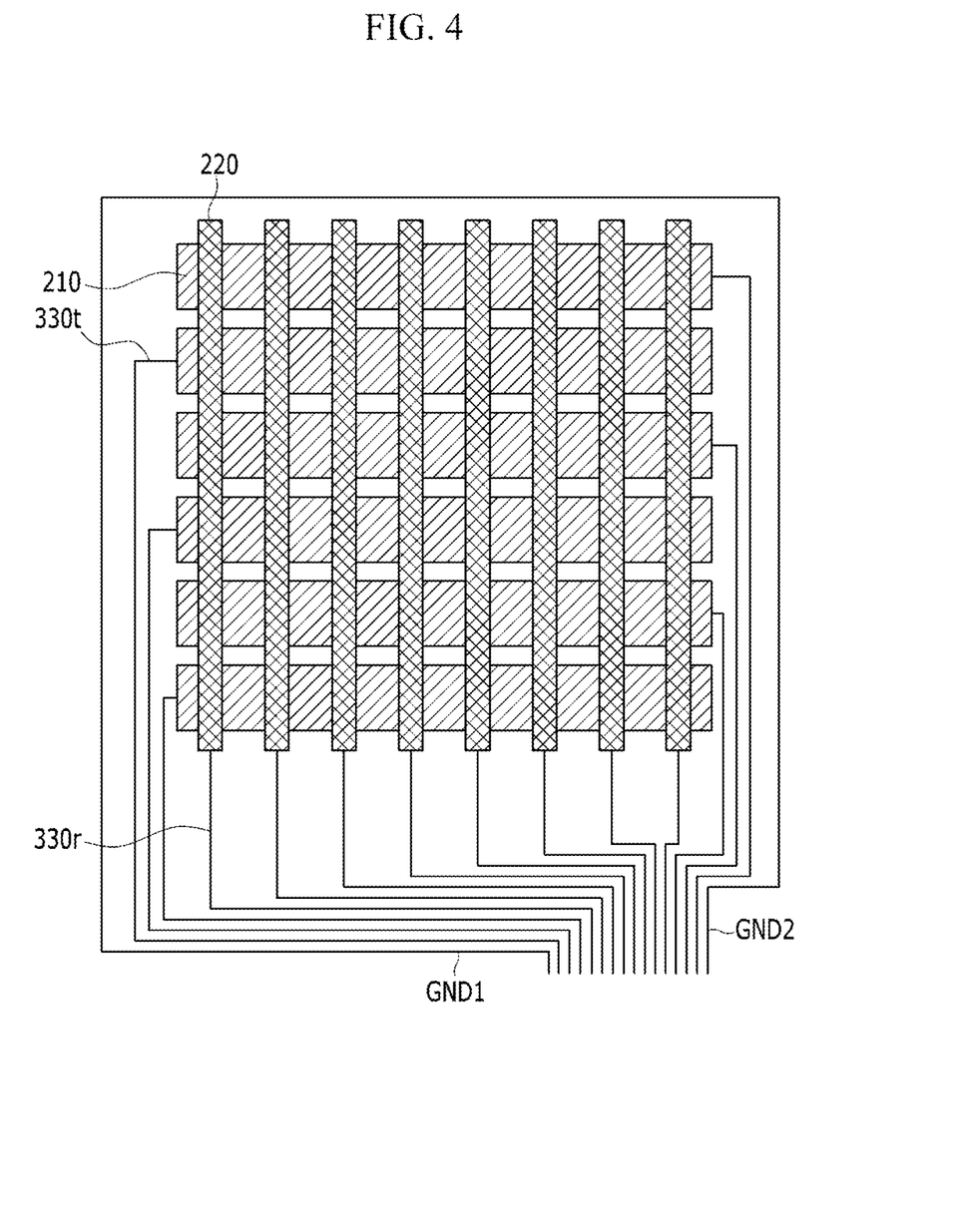
FIG. 4 shows a top plan view of a touch panel according to an exemplary embodiment of the present invention.

FIG. 4 shows a top plan view of a touch panel according to an exemplary embodiment of the present invention.

Referring to FIG. 4, the touch panel 200 includes a plurality of first touch electrodes 210 disposed on a transparent substrate (not shown), and second touch electrodes 220 disposed on the first touch electrodes 210. An insulating layer 230 is disposed between the plurality of driving electrodes 210 and sensing electrodes 220.

The first touch electrodes 210 are driving electrodes for receiving a touch sensing signal and are disposed generally in a first direction, and the second touch electrodes 220 are sensing electrodes for detecting a touch and are disposed generally in a second direction crossing the first direction. The driving electrodes 210 and the sensing electrodes 220 are formed with a transparent conductive layer such as indium tin oxide (ITO). In an alternative way, the driving electrodes 210 and the sensing electrodes 220 can be formed of a metal mesh or carbon nanotubes (CNT).

The insulating layer 230 is provided between the driving electrodes 210 and the sensing electrodes 220 and separates the driving electrodes 210 and the sensing electrodes 220. The insulating layer can use an inorganic insulating material such as a silicon oxide ($SiO_x$) or a silicon nitride ($SiN_x$). Further, the insulating layer can be an organic insulating material such as a cellulose derivative, an olefin-based resin, an acryl-based resin, a vinyl chloride-based resin, a styrene-based resin, a polyester-based resin, a polyamide-based resin, a polycarbonate-based resin, a polycycloolefin-based resin, or an epoxy resin.

The driving electrodes 210 and the sensing electrodes 220 are separated by the insulating layer 230 to form a capacitance between the driving electrodes 210 and the sensing electrodes 220.

Driving electrodes 210 are connected to a plurality of first sensing wires 330*t*, and sensing electrodes 220 are connected to a plurality of second sensing wires 330*r*. The first sensing wires 330*t* and the second sensing wires 330*r* are connected to the touch sensor 730. The touch sensor 730 applies a touch detecting signal to a plurality of driving electrodes 210 through a plurality of first sensing wires 330*t*, and receives a detection signal for indicating a variation of capacitance of a plurality of sensing electrodes 220 through a plurality of second sensing wires 330*r*, so as to detect a touch position.

The touch substrate (not shown) can further include ground wires GND1 and GND2. The ground wires GND1 and GND2 can be disposed outside the driving electrodes 210 and the sensing electrodes 220. That is, the ground wires GND1 and GND2 can be disposed to form a closed loop along an edge of the touch substrate (not shown) and surrounding the driving electrodes 210 and the sensing electrodes 220. The ground wire GND1 and the ground wire GND2 are connected to the touch sensor 730. The ground wires GND1 and GND2 can be electrically connected to a ground power source to remove static electricity from the external environment, and for this purpose, the ground wires GND1 and GND2 can be electrically connected to a ground power source of the second flexible printed circuit board 710.

A method for a touch sensor 730 to receive a detection signal induced by an external touch and external pressure so as to detect a touch position will now be described with reference to FIG. 5 and FIG. 6.

Figure 5:
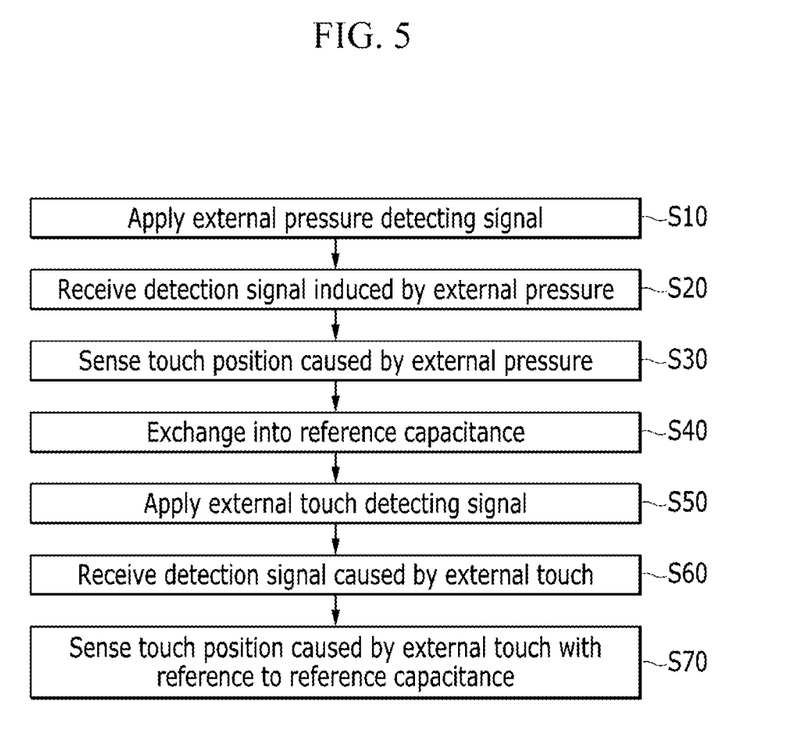
FIG. 5 shows a flowchart for detecting a touch position induced by an external touch and an external pressure by a touch sensor.
Figure 6:
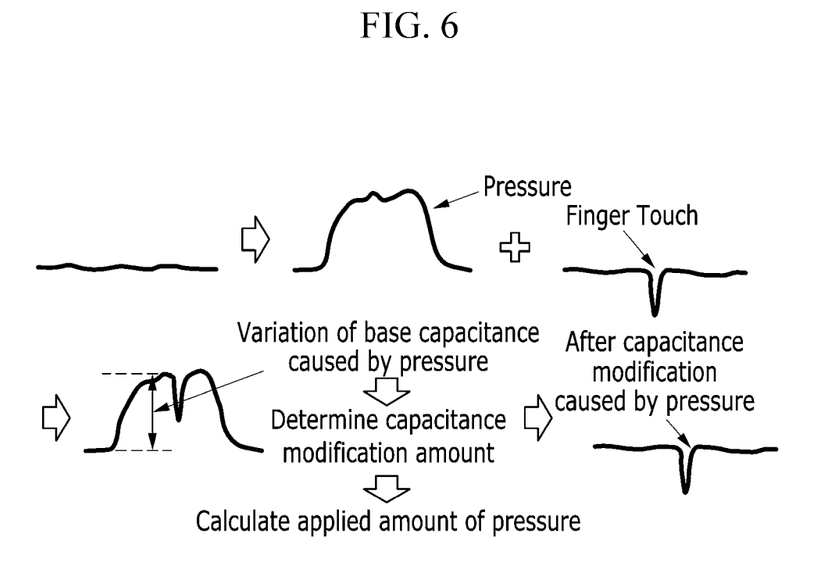
FIG. 6 shows an algorithm for exchanging reference capacitance by a touch sensor.

FIG. 5 shows a flowchart for detecting a touch position induced by an external touch and an external pressure by a touch sensor, and FIG. 6 shows an algorithm for exchanging reference capacitance by a touch sensor.

Referring to FIG. 2, FIG. 5, and FIG. 6, the touch sensor 730 detects a changed pressure caused by a change in the gap between the first touch electrode 210 of the touch panel 200 and the upper electrode 175 due to an external pressure, and thereby detects the touch position. The touch sensor 730 can also detect the touch position by sensing a changed capacitance between the first and second touch electrodes 210 and 220 caused by an external touch.

In further detail, the touch sensor 730 applies an external pressure detecting signal to the first and second touch electrodes 210 and 220 and the upper electrode 175 (S10), and receives a detection signal induced by an external pressure (S20) to detect the pressure from the change of gap between the first and second touch electrodes 210 and 220 and the upper electrode 175.

The touch sensor 730 senses a touch position by the external pressure on the basis of the detection signal (S30).

The touch sensor 730 calculates a capacitance between the first touch electrode 210 of the touch panel 200 and the upper electrode 175 which is the capacitance resulting from the external pressure, and sets this capacitance due to external pressure as a reference capacitance to calculate a change in capacitance between the first and second touch electrodes 210 and 220 caused by an external touch (S40).

The touch sensor 730 applies an external touch detecting signal to the first and second touch electrodes 210 and 220 (S50), and receives a detection signal caused by an external touch (S60) to detect the capacitance caused by the change in spacing between the first touch electrode 210 and the second touch electrode 220.

The touch sensor 730 then calculates a capacitance between the first and second touch electrodes 210 and 220 caused by a subsequent external touch with reference to the reference capacitance, to sense a touch position caused by an external touch (S70). That is, the touch sensor 730 sets the capacitance between the first touch electrode 210 of the touch panel 200 and the upper electrode 175 by a previous external pressure as the reference capacitance, and compares the reference capacitance to a subsequent capacitance between the first and second touch electrodes 210 and 220 to sense a touch position by an external touch.

That is, the display device according to an exemplary embodiment of the present invention receives the detection signal caused by an external pressure as well as the detection signal caused by an external touch, and uses one touch sensor 730 for the purpose of detecting both, thereby reducing the production cost by not applying an additional pressure sensor.

The touch position caused by pressure can be detected in a situation in which it is difficult to perform a touch with a conductor such as a finger. Thus, embodiments of the invention allow for detection of touches from conductors rather than just fingers, thus allowing users to operate touch panels even when they cannot use their fingers.

A display device according to various exemplary embodiments of the present invention will be described hereinafter.

Figure 7:
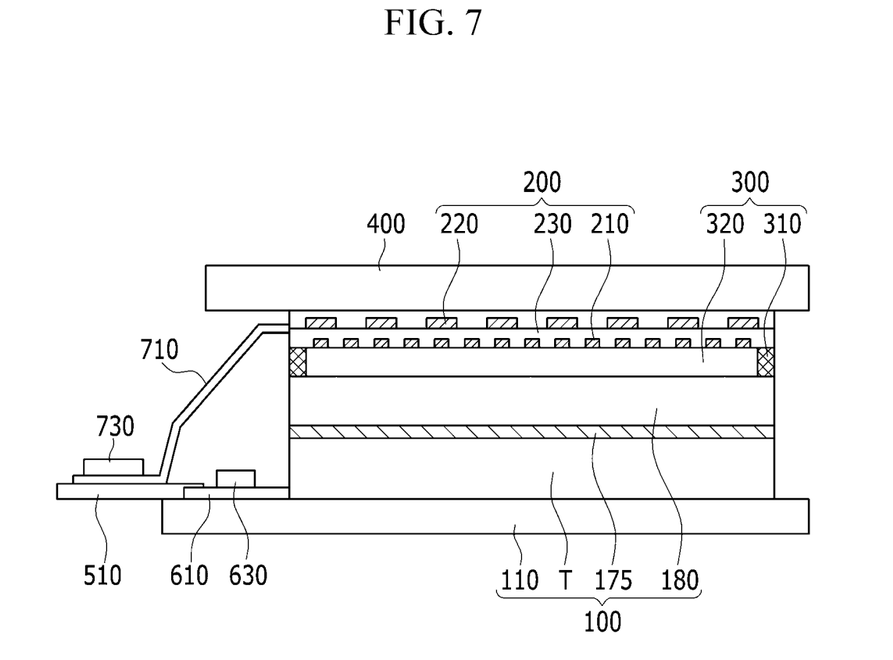
FIG. 7, FIG. 8, and FIG. 9 show cross-sectional views of a display device according to another exemplary embodiment.

FIG. 7 shows a cross-sectional view of a display device according to another exemplary embodiment of the present invention, which corresponds to the display device described with reference to FIG. 1 and FIG. 2 except for a modification of the structure of the elastic layer 300. Therefore, like constitutional elements will have like reference numerals, and no repeated descriptions of the like constitutional elements will be provided.

Referring to FIG. 7, the display device includes a display panel 100, a touch panel 200, an elastic layer 300, and a cover window 400.

The elastic layer 300 represents a layer for elastically varying a gap between a plurality of touch electrodes 210 and 220 of the touch panel 200 and the upper electrode 175 of the display panel 200, by elastically varying a restorable height in response to an external touch and pressure, and thus generates a capacitance that varies by a change in the gap between the touch electrodes 210 and 220 and the upper electrode 175.

The elastic layer 300 can include an adhesive tape 310 provided on an edge of the display panel 100 and an air layer 320 formed inside the adhesive tape 310.

The adhesive tape 310 can allow the display panel 100 to adhere to the touch panel 200, and the air layer 320 is a region surrounded by the adhesive tape 310, the display panel 100, and the touch panel 200, is filled with air or any other suitable gas or liquid medium, and is elastically altered by an external pressure.

Figure 8:
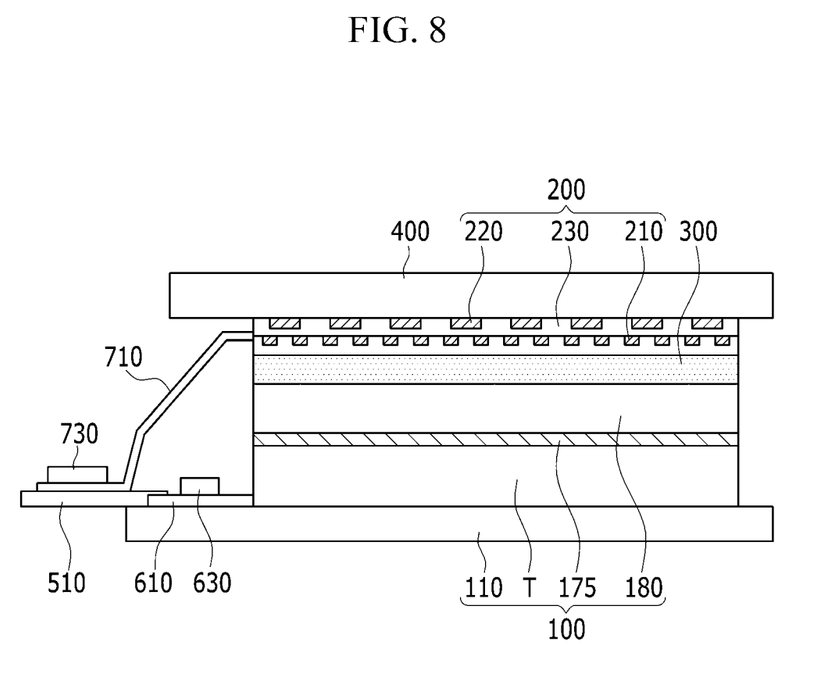

FIG. 8 shows a cross-sectional view of a display device according to still another exemplary embodiment of the present invention, which corresponds to the display device described with reference to FIG. 1 and FIG. 2 except for the structure of the touch panel 200. Therefore, like constitutional elements will have like reference numerals, and no repeated descriptions of the like constitutional elements will be provided.

Referring to FIG. 8, the display device includes a display panel 100, a touch panel 200, an elastic layer 300, and a cover window 400.

The touch panel 200 includes a plurality of first touch electrodes 210, a plurality of second touch electrodes 220, and an insulating layer 230 disposed between each first touch electrode 210 and second touch electrode 220.

Each first touch electrode 210 is a driving electrode to which a touch sensing signal is applied, and each second touch electrode 220 is a sensing electrode for detecting a touch. In this instance, the second touch electrodes 220 can be formed on a cover window 400 without an additional transparent substrate sensor layer.

That is, a thickness of the display device can be reduced by forming the second touch electrode 220 on a surface of the cover window 400 as an integrated body.

Figure 9:
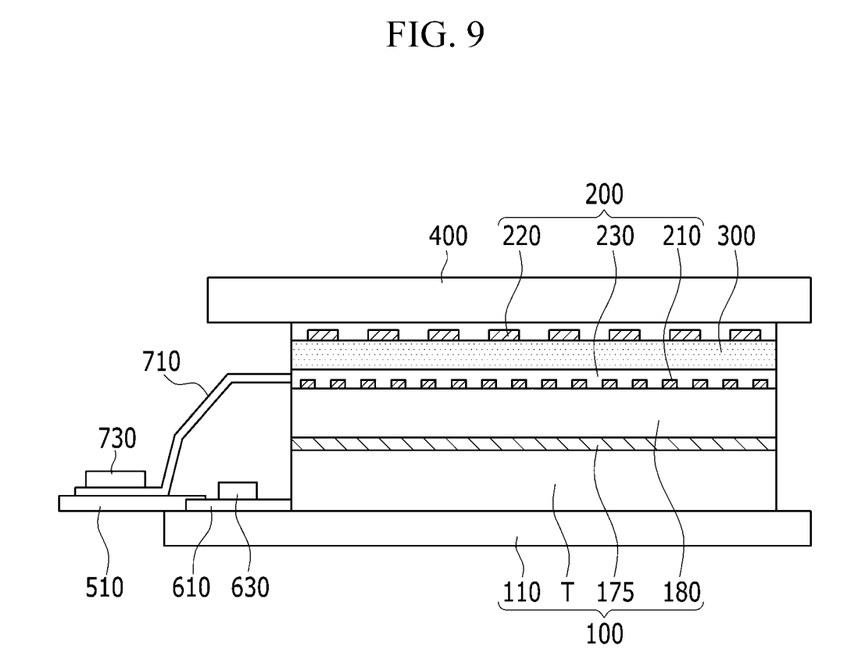

FIG. 9 shows a cross-sectional view of a display device according to a still further exemplary embodiment of the present invention, which corresponds to the display device described with reference to FIG. 1 and FIG. 2 except for the configuration of the touch panel 200. Therefore, like constitutional elements will have like reference numerals, and no repeated descriptions of the like constitutional elements will be provided.

Referring to FIG. 9, the display device includes a display panel 100, a touch panel 200, an elastic layer 300, and a cover window 400.

The touch panel 200 includes a plurality of first touch electrodes 210 and second touch electrodes 220.

The first touch electrodes 210 are driving electrodes for receiving a touch sensing signal, and the second touch electrodes 220 are sensing electrodes for detecting a touch.

The first touch electrodes 210 are provided between the encapsulation layer 180 and the elastic layer 300, and the second touch electrodes 220 are provided between the elastic layer 300 and the cover window 400.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. The various features of each embodiment can be mixed and matched in any manner, to produce further embodiments contemplated by the invention.

What is claimed is:

1. A display device comprising:
    a display panel including an upper electrode and an encapsulation layer provided on the upper electrode;
    a touch panel including a first touch electrode and a second touch electrode each facing the upper electrode and positioned between the display panel and a cover window covering the display panel, the first touch electrode being separated from the second touch electrode;
    an elastic layer provided on the display panel and deforming in response to an applied pressure from a touch; and
    a touch sensor programmed to detect an applied pressure from a capacitance between the upper electrode and both the first and second touch electrodes due to the applied pressure and to detect a capacitance between the first touch electrode and the second touch electrode caused by the touch, so as to sense a position of the touch,
    wherein the touch sensor determines the pressure to sense a touch position caused by the applied pressure, designates a capacitance between the first touch electrode and the upper electrode resulting from the applied pressure as a reference capacitance, and compares the capacitance between the first touch electrode and the second touch electrode caused by the touch to the reference capacitance to sense the touch position,
    wherein the first touch electrode and the second touch electrode are provided between the elastic layer and the cover window.

2. The display device of claim 1, further comprising a ground wire for electrically connecting the touch sensor and the first and second touch electrodes.

3. The display device of claim 1, wherein the touch sensor is provided on a flexible printed circuit board connected to a driving substrate.

4. The display device of claim 1, wherein the elastic layer comprises a resin.

5. The display device of claim 1, wherein the elastic layer is configured with an adhesive tape provided on an edge of the display panel.

6. The display device of claim 1, further comprising a driver for applying a driving signal to subpixels of the display panel.

7. The display device of claim 6, wherein the driver is provided on a display substrate or is provided on a driving substrate connected to the display substrate.

8. The display device of claim 1, wherein the first touch electrode is a driving electrode configured to receive a touch sensing signal, and the second touch electrode is a sensing electrode for detecting a touch.

9. The display device of claim 1, wherein the first touch electrode and the second touch electrode are provided on different layers.

10. The display device of claim 9, wherein the display device includes an insulating layer provided between the first touch electrode and the second touch electrode and separating the first touch electrode from the second touch electrode.

11. The display device of claim 10, wherein the second touch electrode is formed on the cover window.

12. The display device of claim 1, wherein the first touch electrode is provided between the encapsulation layer and the elastic layer, and the second touch electrode is provided between the elastic layer and the cover window.

* * * * *